United States Patent
Deane et al.

(10) Patent No.: US 10,074,879 B2
(45) Date of Patent: *Sep. 11, 2018

(54) INSTRUMENTED FLUID-SURFACED ELECTRODE

(75) Inventors: Geoffrey F. Deane, Bellevue, WA (US); Bran Ferren, Beverly Hills, CA (US); William Gates, Redmond, WA (US); W. Daniel Hillis, Encino, CA (US); Roderick A. Hyde, Redmond, WA (US); Muriel Y. Ishikawa, Livermore, CA (US); Edward K. Y. Jung, Bellevue, WA (US); Jordin T. Kare, Seattle, WA (US); Nathan P. Myhrvold, Bellevue, WA (US); Clarence T. Tegreene, Bellevue, WA (US); David B. Tuckerman, Lafayette, CA (US); Thomas Allan Weaver, San Mateo, CA (US); Charles Whitmer, North Bend, WA (US); Lowell L. Wood, Bellevue, WA (US); Victoria Y. H. Wood, Livermore, CA (US)

(73) Assignee: Deep Science, LLC, Bellevue, WA (US)

(*) Notice: Subject to any disclaimer, the term of this patent is extended or adjusted under 35 U.S.C. 154(b) by 612 days.

This patent is subject to a terminal disclaimer.

(21) Appl. No.: 12/803,105

(22) Filed: Jun. 17, 2010

(65) Prior Publication Data

US 2011/0027633 A1 Feb. 3, 2011

Related U.S. Application Data

(63) Continuation-in-part of application No. 12/658,943, filed on Feb. 16, 2010, and a continuation-in-part of application No. 12/462,205, filed on Jul. 29, 2009.

(51) Int. Cl.
*H01M 10/48* (2006.01)
*H01M 14/00* (2006.01)
(Continued)

(52) U.S. Cl.
CPC .............. *H01M 10/48* (2013.01); *H01M 4/00* (2013.01); *H01M 4/36* (2013.01); *H01M 8/04186* (2013.01); *H01M 8/1009* (2013.01)

(58) Field of Classification Search
None
See application file for complete search history.

(56) References Cited

U.S. PATENT DOCUMENTS 3,245,836 A 4/1966 Agruss
3,404,036 A 10/1968 Weber et al.
(Continued)

FOREIGN PATENT DOCUMENTS

CA 2727399 A1 12/2009
CN 1398438 A 2/2003
(Continued)

OTHER PUBLICATIONS

Brown et al.; "Chapter 20, Electrochemistry"; Chemistry, The Central Science; pp. 730-732; 7th Ed; Prentice Hall; NH; US.
(Continued)

*Primary Examiner* — Barbara Lee Gilliam
*Assistant Examiner* — Adam A Arciero
(74) *Attorney, Agent, or Firm* — Foley & Lardner LLP (57) ABSTRACT

An electrochemical device (such as a battery) includes at least one electrode having a fluid surface and one or more sensors configured to detect an operating condition of the device. Fluid-directing structures may modulate flow or retain fluid in response to the sensors. An electrolyte within the device may also include an ion-transport fluid, for example infiltrated into a porous solid support.

25 Claims, 6 Drawing Sheets (51) Int. Cl.
  *H01M 4/00* (2006.01)
  *H01M 8/04186* (2016.01)
  *H01M 8/1009* (2016.01)
  *H01M 4/36* (2006.01)

(56) References Cited

U.S. PATENT DOCUMENTS

| | | |
|---|---|---|
| 3,448,365 A | 6/1969 | Jacobson |
| 3,523,829 A | 8/1970 | McCully |
| 3,811,943 A | 5/1974 | Minck et al. |
| 3,840,407 A | 10/1974 | Yao et al. |
| 3,883,367 A | 5/1975 | Chiku et al. |
| 3,915,741 A | 10/1975 | Kogiso et al. |
| 3,966,492 A | 6/1976 | Ludwig |
| 3,980,496 A | 9/1976 | Ludwig et al. |
| 4,024,319 A | 5/1977 | Kagawa |
| 4,038,464 A | 7/1977 | Baukal et al. |
| 4,044,191 A | 8/1977 | Evans et al. |
| 4,049,885 A | 9/1977 | Mitoff |
| 4,065,602 A | 12/1977 | Roche et al. |
| 4,127,705 A | 11/1978 | Fischer et al. |
| 4,148,974 A | 4/1979 | Eppley |
| 4,154,902 A | 5/1979 | Schwartz |
| 4,164,610 A | 8/1979 | Beall et al. |
| 4,208,253 A | 6/1980 | Formaro et al. |
| 4,226,923 A | 10/1980 | Mikkor |
| 4,230,778 A | 10/1980 | von Benda et al. |
| 4,237,196 A | 12/1980 | Gütmann et al. |
| 4,283,468 A | 8/1981 | Goebel et al. |
| 4,311,772 A | 1/1982 | Herczog |
| 4,332,868 A | 6/1982 | Anand et al. |
| 4,347,295 A | 8/1982 | Herczog |
| 4,382,116 A | 5/1983 | Gahn et al. |
| 4,430,393 A | 2/1984 | Bennett et al. |
| 4,578,325 A | 3/1986 | Gotou et al. |
| 4,810,600 A | 3/1989 | Périard et al. |
| 4,833,046 A | 5/1989 | Roy |
| 4,886,514 A | 12/1989 | Maget |
| 4,968,568 A | 11/1990 | Higley |
| H858 H | 12/1990 | Leonard et al. |
| 4,977,044 A | 12/1990 | Ludwig |
| 5,034,290 A | 7/1991 | Sands et al. |
| 5,134,044 A | 7/1992 | Megerle |
| 5,158,840 A | 10/1992 | Megerle |
| 5,162,172 A | 11/1992 | Kaun |
| 5,258,241 A | 11/1993 | Ledjeff et al. |
| 5,366,824 A * | 11/1994 | Nozaki et al. ............ 429/471 |
| 5,382,480 A | 1/1995 | Molyneux |
| 5,532,077 A | 7/1996 | Chu |
| 5,645,949 A | 7/1997 | Young |
| 5,674,592 A | 10/1997 | Clark et al. |
| 5,929,606 A | 7/1999 | Faulk |
| 6,064,804 A | 5/2000 | Brink et al. |
| 6,187,479 B1 | 2/2001 | Liu |
| 6,214,487 B1 | 4/2001 | Kelley et al. |
| 6,468,688 B2 | 10/2002 | Kazacos et al. |
| 6,555,262 B1 | 4/2003 | Kaiser et al. |
| 6,593,669 B1 | 7/2003 | Lemaire et al. |
| 6,641,948 B1 | 11/2003 | Ohlsen et al. |
| 6,692,862 B1 | 2/2004 | Zocchi |
| 6,713,987 B2 | 3/2004 | Krasnov et al. |
| 6,720,107 B1 | 4/2004 | Holtom et al. |
| 6,815,117 B2 * | 11/2004 | Hauer ............................ 429/90 |
| 6,953,630 B2 | 10/2005 | Wells |
| 7,105,245 B2 | 9/2006 | Ohlsen et al. |
| 7,157,177 B2 | 1/2007 | Chan |
| 7,238,444 B2 | 7/2007 | Sada et al. |
| 7,306,822 B2 | 12/2007 | Yadav et al. |
| RE40,218 E | 4/2008 | Landau |
| 7,633,261 B2 | 12/2009 | Baron et al. |
| 2001/0019794 A1* | 9/2001 | Horie et al. ............. 429/90 |
| 2002/0106549 A1 | 8/2002 | Cooper et al. |
| 2003/0022040 A1 | 1/2003 | Wells |
| 2003/0057970 A1 | 3/2003 | Shiraki et al. |
| 2003/0108788 A1* | 6/2003 | Miyoshi et al. ............ 429/104 |
| 2003/0134163 A1 | 7/2003 | Markoski et al. |
| 2003/0143456 A1 | 7/2003 | Kazacos et al. |
| 2003/0198862 A1 | 10/2003 | Struthers |
| 2004/0001991 A1 | 1/2004 | Kinkelaar et al. |
| 2004/0059717 A1 | 3/2004 | Klare et al. |
| 2004/0191127 A1 | 9/2004 | Kornblit et al. |
| 2004/0224204 A1 | 11/2004 | Smotkin et al. |
| 2005/0139466 A1 | 6/2005 | Morris |
| 2005/0158614 A1* | 7/2005 | Hennessy ................ 429/61 |
| 2005/0175898 A1* | 8/2005 | Yong et al. ............ 429/231.1 |
| 2005/0282063 A1 | 12/2005 | Zecevic et al. |
| 2006/0099502 A1 | 5/2006 | Kim et al. |
| 2006/0183016 A1 | 8/2006 | Kazacos et al. |
| 2006/0222915 A1 | 10/2006 | Sumino et al. |
| 2006/0251957 A1 | 11/2006 | Darcy et al. |
| 2006/0263665 A1 | 11/2006 | Schaevitz et al. |
| 2006/0269814 A1 | 11/2006 | Horton, III et al. |
| 2007/0015016 A1 | 1/2007 | Aoyama et al. |
| 2007/0026293 A1 | 2/2007 | Kim et al. |
| 2007/0065708 A1 | 3/2007 | Owejan et al. |
| 2007/0209944 A1 | 9/2007 | Aune et al. |
| 2007/0215483 A1 | 9/2007 | Johansen et al. |
| 2007/0218321 A1 | 9/2007 | O'Brien |
| 2008/0003507 A1 | 1/2008 | Nanjundiah |
| 2008/0008911 A1 | 1/2008 | Stroock et al. |
| 2008/0023321 A1 | 1/2008 | Sadoway |
| 2008/0026267 A1 | 1/2008 | Rikihisa et al. |
| 2008/0044725 A1* | 2/2008 | Sadoway et al. ............ 429/149 |
| 2008/0115930 A1 | 5/2008 | Peters et al. |
| 2008/0124586 A1 | 5/2008 | Wang et al. |
| 2008/0318089 A1 | 12/2008 | Schneider et al. |
| 2009/0017379 A1 | 1/2009 | Inatomi et al. |
| 2009/0053596 A1 | 2/2009 | Stauffer |
| 2009/0068515 A1 | 3/2009 | Chen et al. |
| 2009/0071841 A1 | 3/2009 | Pal et al. |
| 2009/0155631 A1 | 6/2009 | Baek et al. |
| 2009/0215211 A1 | 8/2009 | Tremsin et al. |
| 2009/0233156 A1 | 9/2009 | Kroupenkine et al. |
| 2009/0242036 A1 | 10/2009 | Kolodner et al. |
| 2009/0279093 A1 | 11/2009 | Van Herpen et al. |
| 2010/0003586 A1 | 1/2010 | Sahu |
| 2010/0009231 A1 | 1/2010 | Kim et al. |
| 2010/0047671 A1 | 2/2010 | Chiang et al. |
| 2010/0092843 A1 | 4/2010 | Conway |
| 2010/0304192 A1* | 12/2010 | Chan ................ H01G 2/08 429/50 |
| 2011/0014503 A1 | 1/2011 | Bradwell et al. |
| 2011/0027624 A1* | 2/2011 | Deane et al. ............ 429/49 |
| 2011/0027628 A1* | 2/2011 | Deane et al. ............ 429/50 |
| 2011/0281169 A1 | 11/2011 | Zheng et al. |
| 2012/0077070 A1 | 3/2012 | Soloveichik et al. |

FOREIGN PATENT DOCUMENTS

| | | |
|---|---|---|
| CN | 100517851 | 7/2009 |
| JP | 63152880 | 6/1988 |
| JP | 07282832 | 10/1995 |
| JP | 2004536437 A | 12/2004 |

OTHER PUBLICATIONS

Armand, Michel et al.; "Ionic-liquid materials for the electrochemical challenges of the future"; Nature Materials; bearing a date of Aug. 2009; pp. 621-629; vol. 8; © 2009 Macmillan Publishers Limited.

Lahann et al.; "A Reversibly Switching Surface"; Science; Bearing a date of Jan. 17, 2003; pp. 371-374; vol. 299.

MacFarlane et al.; "Lithium-doped plastic crystal electrolytes exhibiting fast ion conduction for secondary batteries"; NATURE; Bearing a date of Dec. 16, 1999; pp. 792-794; vol. 402; Macmillan Magazines Ltd.

Patel, Monalisa; Bhattacharyya, Aninda J.; "Plastic-polymer composite electrolytes: Novel soft matter electrolytes for rechargeable lithium batteries"; Electrochemistry Communications; Bearing a date of 2008; pp. 1912-1915; vol. 10; Elsevier B.V.

(56) References Cited

OTHER PUBLICATIONS

Wright, Randy; "New battery could change world, one house at a time"; Daily Herald; bearing a date of Apr. 4, 2009; pp. 1-6; located at http://www.heraldextra.com/news/article_b0372fd8-3f3c-11de-ac77-001cc4c002e0.html; printed on Aug. 18, 2009.
PCT International Search Report; International App. No. PCT/US2010/002101; bearing a date of Sep. 17, 2010; pp. 1-3.
PCT International Search Report; International App. No. PCT/US 10/02100; bearing a date of Sep. 28, 2010; pp. 1-2.
Colom et al.; "Bismuth electrodeposition in molten salts"; Electrochimica Acta; Aug. 1, 1965; manuscript received Oct. 28, 1964; pp. 835-847; vol. 10; Pergamon Press Ltd., Northern Ireland.
European Patent Office; Supplementary European Search Report; Pursuant to Rule 62 EPC; App. No. EP 10 80 4819; Mar. 27, 2014 (received by our agent on Apr. 7, 2014); pp. 1-2.
European Patent Office; Supplementary European Search Report; Pursuant to Rule 62 EPC; App. No. EP 10 76 0135; Mar. 27, 2014 (received by our agent on Apr. 7, 2014); pp. 1-2.
Nahtigal, Istok Gorazd; "Supercritical Aqueous Solutions of Sodium Chloride: Classical Insights into Nucleation and Reactivity"; a thesis submitted to the Department of Chemistry in conformity with the requirements for the degree of Master of Science, Queen's University, Kingston, Ontario, Canada; Nov. 2008; cover page, pp. ii-xiii and pp. 1-106 (119 pages total).
Good et al.; "A new approach for determining roughness by means of contact angles on solids"; *Mittal Festschrift*; bearing a date of 1998; pp. 181-197; VSP.
Perez-Mendoza et al.; "Analysis of the microporous texture of a glassy carbon by adsorption measurements and Monte Carlo simulation. Evolution with chemical and physical activation"; Carbon; Sep. 28, 2005; pp. 638-645; vol. 44; Elsevier Ltd.
European Patent Office, Communication Pursuant to Article 94(3) EPC; App. No. EP 10 760 135.3-1372; Oct. 12, 2016 (received by our agent on Oct. 12, 2016); pp. 1-7.
European Patent Office, Communication Pursuant to Article 94(3) EPC; App. No. EP 10 804 819.0-1373; Oct. 17, 2016 (received by our agent on Oct. 17, 2016); pp. 1-11.

* cited by examiner

INSTRUMENTED FLUID-SURFACED ELECTRODE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/658,943, entitled INSTRUMENTED FLUID-SURFACED ELECTRODE, naming Geoffrey F. Deane, Bran Ferren, William Gates, W. Daniel Hillis, Roderick A. Hyde, Muriel Y. Ishikawa, Edward K.Y. Jung, Jordin T. Kare, Nathan P. Myhrvold, Clarence T. Tegreene, David B. Tuckerman, Thomas A. Weaver, Charles Whitmer, Lowell L. Wood, Jr., Victoria Y.H. Wood as inventors, filed 16 Feb. 2010, which is currently co-pending, or is an application of which a currently co-pending application is entitled to the benefit of the filing date.

> For purposes of the USPTO extra-statutory requirements, the present application constitutes a continuation-in-part of U.S. patent application Ser. No. 12/462,205, entitled FLUID-SURFACED ELECTRODE, naming Geoffrey F. Deane, Bran Ferren, William Gates, W. Daniel Hillis, Roderick A. Hyde, Muriel Y. Ishikawa, Edward K. Y. Jung, Jordin T. Kare, Nathan P. Myhrvold, Clarence T. Tegreene, David B. Tuckerman, Thomas A. Weaver, Charles Whitmer, Lowell L. Wood, Jr., Victoria Y. H. Wood as inventors, filed Jul. 29, 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

Recent attention to "green" generation of energy has produced a variety of new processes and refinements of existing methods for providing electrical power. However, many renewable energy sources (e.g., solar power and wind power) may be only intermittently available, thus possibly requiring substantial storage capacity in order to provide electricity on demand. Even continuously-available power sources (e.g., nuclear) may benefit from electrical energy storage allowing intermittent peak loading in excess of continuously-available average capacity. Existing batteries nominally suitable for these purposes can be expensive to operate, especially on a total unit energy cost basis (considering capital costs and limited cycle lifetimes, especially deep-cycle lifetimes).

Further, existing batteries may have energy densities substantially below those of fossil fuels, thus motivating continued primary use of hydrocarbon fuels for personal transport despite known negative effects of the use of hydrocarbons for such purposes. Improved battery technology could enable more widespread use of electric vehicles supported by "green" power generation.

SUMMARY

In one aspect, an electrochemical device includes two electrodes, an electrolyte, and a sensor. The electrolyte is arranged to conduct an ionic current from a first electrolyte surface in contact with one of the electrodes to a second electrolyte surface in contact with another of the electrodes. At least one of the electrodes includes an electrochemically active fluid layer, a surface of the electrochemically active fluid layer being in contact with the electrolyte. The sensor is configured to detect an operating condition of the electrochemical device in proximity to the surface of the electrochemically active fluid layer in contact with the electrolyte. The device may further include a controller, which may be configured to respond to a signal from the sensor by modifying an operating parameter of the electrochemical device. The controller may include a memory or a transmitter, and may be configured to respond to a history of signals from the sensor. The device may include multiple sensors, which may be configured to detect the same or different operating conditions (e.g., chemical composition, chemical activity, ion density, density, temperature, flow velocity, flow direction, viscosity, or surface tension of the electrochemically active fluid layer, or temperature, magnetic field magnitude, magnetic field direction, electrochemical potential, current, current density, distance between two surfaces of the device, position of a portion of a surface of the electronic device, or gradients of any of the foregoing), at the same or different locations within the device. At least one of the electrodes may include a solid support, to which the electrochemically active fluid layer may cling by a surface energy effect. This solid support may include a fluid-directing structure, which may be configured to adjust a flow parameter of the electrochemically active fluid layer in response to an operating condition detected by the sensor(s). The electrolyte may be further arranged to conduct an ionic current from the second electrolyte surface to the first electrolyte surface (i.e., to run in reverse). The electrolyte may include a solid surface (e.g., impervious to the electrochemically active fluid) or an ion-transport fluid through which an ion can move to produce the ionic current. The electrochemically active fluid may include a liquid metal, an ionic fluid, a finely dispersed metal, a finely dispersed semi-metal, a finely dispersed semiconductor, or a finely dispersed dielectric. At least one electrode may include one or more of the elements lithium, sodium, mercury, tin, cesium, rubidium, calcium, magnesium, strontium, aluminum, potassium, gallium, iron, mercury, tin, sulfur, oxygen, fluorine, or chlorine, and the electrolyte may include a perchlorate, an ether, tetrahydrofuran, graphene, a polyimide, a succinonitrile, a polyacrylonitrile, polyethylene oxide, polyethylene glycol, ethylene carbonate, beta-alumina, an ion-conducting glass, or an ion-conducting ceramic.

In another aspect, a method of supplying electrochemical energy includes connecting an electrical load to a first and a second electrode separated by an electrolyte arranged to conduct an ionic current from a first electrolyte surface in contact with the first electrode to a second electrolyte surface in contact with the second electrode, and monitoring a sensor configured to detect an operating condition of the electrochemical device in proximity to the first or second electrolyte surface. At least one of the first and second electrodes includes an electrochemically active fluid layer in contact with the electrolyte. Monitoring the sensor may include adjusting an operating parameter (e.g., a fluid flow parameter) of the electrochemical device in response to a signal from the sensor, for example monitoring a condition local to the sensor and adjusting a parameter local to the sensor in response.

In another aspect, an electrochemical device includes two electrodes, an electrolyte, and a plurality of local sensors configured to detect an operating condition of the electrochemical device. The electrolyte is arranged to conduct an ionic current from a first electrolyte surface in contact with one of the electrodes to a second electrolyte surface in contact with another of the electrodes. At least one of the electrodes includes an electrochemically active fluid layer, a surface of the electrochemically active fluid layer being in contact with the electrolyte. Each local sensor is configured to detect the operating condition at a predetermined location within the device (e.g., at a plurality of locations within the device). The device may further include a controller configured to use data from one or more of the plurality of local sensors to direct an adjustment of an operating parameter of the electrochemical device.

In another aspect, an electrochemical device includes two electrodes, an electrolyte, and a first sensor configured to detect an operating condition of the electrochemical device. The electrolyte is arranged to conduct an ionic current from a first electrolyte surface in contact with one of the electrodes to a second electrolyte surface in contact with another of the electrodes. At least one of the electrodes is a fluid-surfaced electrode including an electrochemically active fluid layer and a solid support including a electrical control region separating two electrically distinct regions, a surface of the electrochemically active fluid layer being in contact with the electrolyte. The electric control region may include a passive or an active element, or may include a resistor, a capacitor, an inductor, a diode, a transistor, an integrated circuit, a switch, or a memory.

In another aspect, a method of maintaining an electrochemical device including an electrochemically active fluid layer includes monitoring a sensor configured to detect an operating condition of the electrochemical device, and adjusting a flow parameter of the electrochemically active fluid layer (e.g., an electrode layer or an electrolyte layer) in response to a signal from the sensor. Adjusting the flow parameter may include, for example, initiating or terminating flow within the electrochemically active fluid layer, or adjusting a flow rate, a flow direction, or a fluid characteristic (e.g., viscosity, temperature, chemical composition, chemical activity, ion density, density, or surface tension) of the electrochemically active fluid layer.

In another aspect, a method of operating an electrochemical device including an electrochemically active fluid layer includes receiving a signal from each member of a plurality of sensors, each configured to detect an operating condition of the electrochemical device, using the received signals to determine a performance parameter for the device, and transmitting, displaying, or storing in a tangible storage medium data pertaining to the determined performance parameter of the electrochemical device.

In another aspect, a method of operating an electrochemical device including an electrochemically active fluid layer includes receiving a first signal from a sensor set configured to detect at least one operating condition of the electrochemical device, and iteratively adjusting an operating parameter of the electrochemical device and receiving a second signal from the sensor set, the second signal reflecting any changes to the at least one operating condition subsequent the adjustment of the operating parameter until the at least one operating condition matches a desired value or range of values.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

As used herein, the term "fluid" includes any condensed phase lacking substantial shear strength, including liquids, pastes, gels, emulsions, and supercritical fluids. Unless context dictates otherwise, materials within electrochemical devices that are described as "fluids" have a fluidic character at the working temperature and pressure of the device, which may be room temperature or another temperature (e.g., 0° C., 25° C., 50° C., 75° C., 100° C., 200° C., 400° C., 800° C., or any other suitable temperature), and ambient pressure or another suitable working pressure.

As used herein, the term "smooth," when used to describe a surface wetted by a fluid layer, includes a surface having a local radius of curvature significantly greater than the thickness of the fluid layer at the location where the radius of curvature is measured.

As used herein, the term "cling," when used to describe a fluid in contact with a solid, includes a fluid that wets or otherwise substantially adheres to the solid, for example with a force sufficient to maintain contact with the solid in some degree of opposition to a gravitational force.

As used herein, the term "ionic current" includes any movement of electrical charge created by bulk diffusion or flow of ions. An "ionic current" is said to flow from a positive potential to a negative potential, even if it is produced in part or in whole by a movement of (negatively charged) ions in the opposite direction. A material "conducts" ionic current if it permits ions to pass through it to create a net flow of charge. These ions may be already present in the material or may enter through an interface.

As used herein, the term "micropatterned" includes surfaces exhibiting structures of roughly submillimeter size (including micron-scale and nanoscale structures), where these structures form predetermined shapes or have a predetermined effect on fluid thickness or flow in their vicinity. Micropatterned surfaces may, but need not, include repeating arrays of features, and may be constructed, for example, by micromachining, lithography, molding (including extrusion), printing, stamping, replica-printing, or other processes.

As used herein, the term "microfeatured" includes surfaces exhibiting structures of roughly submillimeter size (including micron-scale and nanoscale structures), where the shapes or flow characteristics of the structures may (but need not) have a random, stochastic, or aperiodic component.

As used herein, the term "impervious" includes substances that resist flow or penetration of a specified fluid. A substance may still be termed "impervious" to a fluid if it is gradually degraded by the fluid over time.

As used herein, the term "conductor" includes electronic conductors, ionic conductors, or semiconductors, unless context dictates otherwise.

Figure 1:
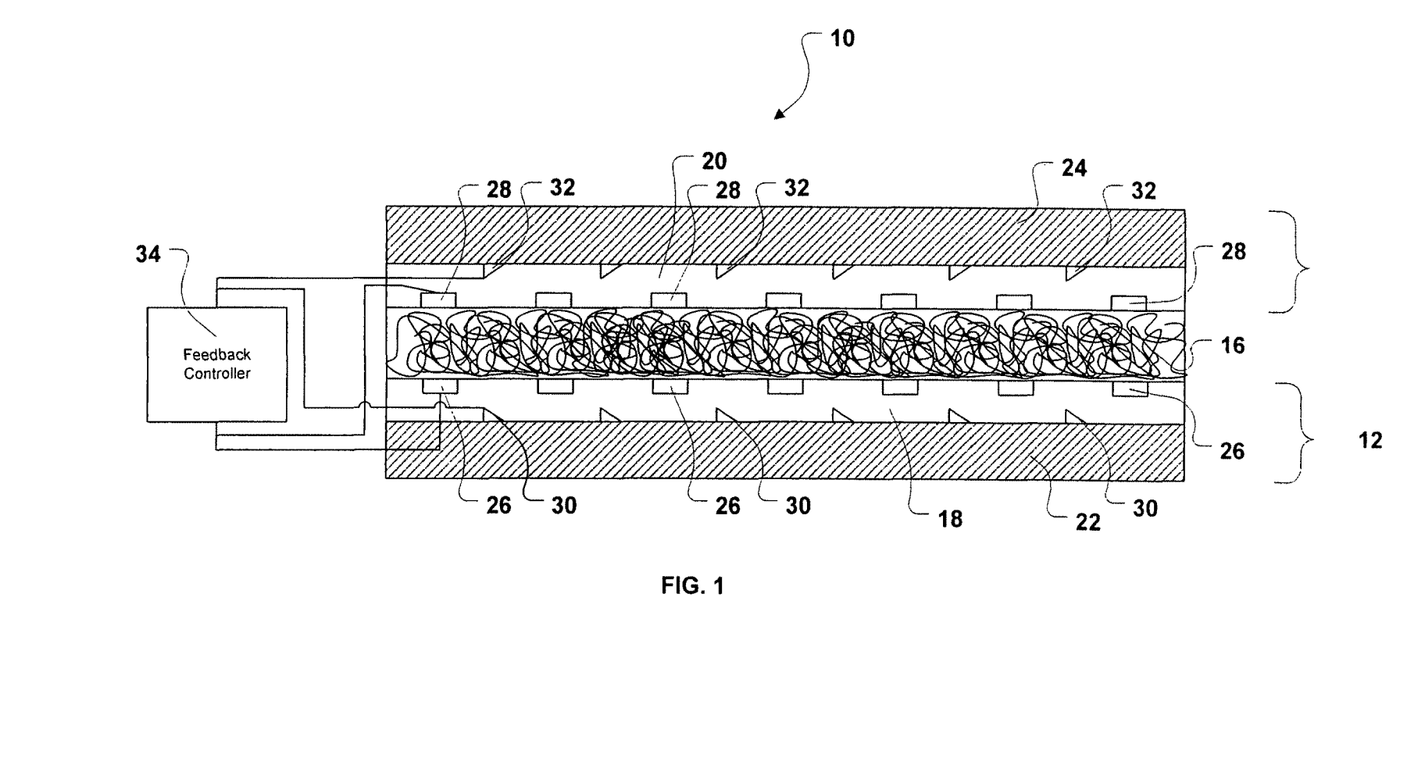
FIG. 1 is a schematic of an electrochemical device including two fluid-surfaced electrodes.

FIG. 1 is a schematic of an instrumented electrochemical device 10 including two fluid-surface electrodes, cathode 12 and anode 14, separated by electrolyte 16. In the illustrated embodiment, electrolyte 16 includes a porous support infiltrated with an ion-transport fluid, but other embodiments may include other electrolytes, for example a solid electrolyte or a fully fluid electrolyte, or the electrolyte layer may include multiple regions having different character, such as two immiscible fluids, or two fluids separated by an ion-conducting membrane. Each of the two electrodes includes an electrochemically active fluid layer 18, 20 that clings to a solid support 22, 24. In some embodiments, solid supports 22, 24 may be chemically similar or identical to their corresponding electrochemically active fluid layers 18, 20, while in other embodiments, these structures may be chemically dissimilar. In the illustrated embodiment, during use, electrochemically active fluid layers 18, 20 flow along the surfaces of solid supports 22, 24. In other embodiments, electrochemically active fluids 18, 20 may not flow during operation, or may flow only during selected periods of operation (e.g., during intervals of heavy power draw). In some embodiments (not shown), rather than flowing primarily along the surfaces of solid supports 22, 24, electrochemically active fluid layers 18, 20 may flow (at least in part) through the support, or in a combination of flow through the support and along the surface. For example, one or both electrodes may include a porous support infiltrated with electrochemically active fluid similar to the illustrated electrolyte 16, or a support including microchannels or other fluid-directing structures through or along a surface of the support. Fluid-directing structures may be passive (e.g., microchannels) or active (e.g., pumps or other fluid-moving devices).

Electrochemical device 10 further includes sensors 26, 28, positioned at the interfaces between electrodes 12, 14 and electrolyte 16. While sensors 26, 28 are positioned at these interfaces in the illustrated embodiment, sensors may also or alternatively be positioned elsewhere in the device (e.g., at the interface between an electrochemically active fluid layer and its solid support, within a fluid layer, within a solid support, within the electrolyte, or anywhere else within the device where it may be found desirable to detect or to measure an operating condition or an operating parameter of the device). Illustrated sensors 26, 28 detect a local chemical activity of a chemical species that is relevant to an electrochemical reaction carried out within device 10 (e.g., a carrier ion, a reactant, or a reaction product). In other embodiments, appropriately placed sensors may detect chemical composition, ion density, material density, flow velocity, flow direction, viscosity, temperature, pressure, magnetic field magnitude, magnetic field direction, electrochemical potential, interface location, surface tension, or gradients of any of the above properties.

Electrodes 12, 14 further include fluid-directing structures 30, 32. These structures are arranged to modify fluid flow (e.g., by adjusting a flow rate or direction, by locally altering a fluid property such as surface tension, viscosity, or temperature, or by adjusting composition of fluid flowing into the device, for example by mixing more or less of a dopant into the fluid) in the vicinity of the structure 30, 32. Fluid-directing structures 30, 32 may be movable (e.g., MEMS configured to change flow rate or direction) or fixed (e.g., conductive grids or coils configured to apply an electrical or magnetic field, or heaters or coolers to apply or remove heat, in order to adjust local fluid properties or operating parameters). In use, device 10 may use fluid-directing structures 30, 32 to locally adjust fluid flow parameters in response to chemical activities detected by sensors 26, 28. For example, if one area of cathode fluid 18 is found to be depleted of a reactant species, fluid flow to that area may be increased in order to replenish the depleted reactant. In other embodiments, fluid flow may be modified in response to other sensed conditions as detailed above, or a plurality of different sensor types may be used, in which case flow may be adjusted in response to properties detected by any of the different sensor types, or to a combination thereof. For example, in addition to monitoring composition via sensors 26, 28, additional sensors (not shown) may monitor output voltage (or local internal voltage), and may adjust parameters such as local fluid composition in order to maintain a desired voltage profile in space or time (e.g., a constant voltage). In some embodiments, controller 34 (e.g., a feedback controller or a controller acting in part on external inputs) may accept input from sensors 26 or 28, and may output a control signal to fluid-directing structures 30 or 32 in order to locally adjust fluid flow or position (e.g., by changing fluid flow direction, speed, volume, flow path, or a property of the fluid). In some embodiments, controller 34 may use historical data, as well as or instead of instantaneous data, from one or more of sensors 26, 28. In some embodiments, fluid-directing structures (not shown) may also be provided to adjust the flow of ion-transfer fluid through electrolyte 16.

Electrochemical device 10 may be used as a battery, in which case an electrical load may be connected across cathode 12 and anode 14. When the device is used in this fashion, at least one of the electrochemically active fluid layers 16, 18, 20 may become depleted of a species that participates in the electrochemical reaction, or enriched in a product species of the electrochemical reaction. In some embodiments, this species may be replenished or removed by flow of the electrochemically active fluid layers 16, 18, 20, replacing depleted or enriched fluid with fresh fluid. However, in many embodiments, it will be desirable to regenerate depleted or enriched fluid, either in device 10 or externally. According to one embodiment, depleted fluid may be regenerated within device 10 by "reversing" the battery, using externally-applied electromotive force to drive the species back into the depleted fluid, thereby reversing the battery reaction and converting electrical energy into chemical form. Similarly, enriched fluid may be regenerated within device 10 by reversing the battery, this time using externally-applied electromotive force to remove the product species from the enriched fluid, thereby reversing the battery reaction and converting electrical energy into chemical form. In embodiments where the device is used in either or both of these fashions, sensors 26, 28 (or other appropriately placed sensors) may be used to monitor the progress of the reverse reaction, and flow parameters, currents, or voltages may be adjusted in response to the monitored progress. In some embodiments, a different electrode fluid (e.g., containing the same electrochemically-active species) may be employed during charging and during discharging, and these two different fluids may be deployed on the same or on different portions of the electrode.

Chemical composition, density, temperature, pressure, viscosity, rate-dependent shear properties, and vector velocity may all be used to characterize the state of a fluid component of a battery or other electrochemical device, for example to determine its energy storage capacity relative to a given chemical reaction; fluid components which are colloids, emulsions, or slurries may have additional characterization parameters. Spatial gradients in these parameters may also be useful for locating inappropriately spaced electrode regions or local deviations from a more ideal chemical composition. In general, gradients along the surface of an electrode are expected to be of minimal magnitude in order to minimize irreversibility, at least in areas remote from the electrode edge (e.g., farther from an electrode edge than the local spacing between electrodes or a small multiple thereof). Chemical composition may be inferred, for example, by physical means (e.g., particle or photon backscatter, transmission such as single- or multi-line x-ray transmission, acoustic or ultrasonic sensing) or chemical means (e.g., electrochemical potential relative to a reference, mass density, measurement of one or more transport properties such as thermal or electrical conductivity, viscosity or sound speed). Position of interfaces (e.g., thickness of an electrode fluid layer or the spatial coordinates of its surface) may also be used to infer local reaction characteristics.

Potential field maps and associated ion-density maps in the electrolyte layer may be used for calculating internal irreversibilities and consequent energy losses due to heating. In some embodiments, these calculations may supplement mappings of energy losses done by thermometry. Such spatial maps may be determined, for example, by voltage measurements between the exposed tip of an otherwise-insulated conductor and some potential reference. This exposed tip may be positioned in a single location, or moved among a set of known locations (e.g., by an actuated boom), and the electrochemical device may include one or more such sensors (e.g., an array of sensors), some or all of which may be individually addressable. Such devices may be passive (simply measuring a reference potential) or active (e.g., applying a voltage waveform and observing the ensuing reaction and relaxation of the local electrochemical system, for example to measure composition of the proximate medium by analysis of the resulting polarographic signal). Current measuring devices (e.g., insulated loops of conductor of known size, shape, and orientation, Hall-effect current sensors, or electric-field measuring devices) or arrays of such devices may be used to measure local current densities, either passively or actively. The set of measured current densities may be used, for example, to infer the current distribution throughout the cell, for example by using the measured current densities (and optionally other available information such as the total current flowing in that portion of the device) to estimate the three-dimensional magnetic field within the cell. Alternatively, Hall-effect or other magnetic field sensors may be positioned to measure local magnetic fields, which may be used to calculate local current densities.

Any of the above-described measurements may be used to infer an instantaneous and/or local thermodynamic efficiency of the electrochemical device. This efficiency, for example, may be used to indicate a possible need to replace one or more of the electrochemically active fluids (or to alter a concurrent process for refreshing the fluid), for example due to expending of an electrochemically-active component, or to change the electrical operating conditions of the cell.

Any of the above-described sensors may be tethered (e.g., by an insulated conducting wire) or untethered (e.g., transmitting its data wirelessly or by occasional direct contact for downloading of information).

Electrochemically active fluids which may be used in the electrochemical device include liquid metals (particularly metals liquid at ambient or modestly elevated temperatures), such as mercury, gallium, sodium, potassium, or metallic alloys (e.g., GALINSTAN™, a near-eutectic alloy of gallium, indium, and tin, or sodium-potassium alloys), which may act as carriers for other metals such as lithium, magnesium, or calcium; a variety of organic and inorganic solvents (e.g., diethyl ether, tetrahydrofuran, or fluorocarbons); slurries or suspensions of an adequately-conducting material in a dielectric fluid; and ionic liquids (e.g., those described in Armand, et al., "Ionic-liquid materials for the electrochemical challenges of the future," *Nature Materials* 8:621-629 (2009), which is incorporated by reference herein). Any of these may include dissolved salts or other compounds, or other species that participate in the electrochemical reaction that powers the device or supportionic current flows (e.g., a suspension in a polarized dielectric fluid of particles of a metal, metalloid, semiconductor, or dielectric). In some embodiments, a carrier fluid (e.g., GALINSTAN) is flowed over a "salt lick" reservoir (e.g., a solid surface, a honeycomb or other high surface-to-volume ratio structure, or a fluid surface) containing an electrochemical species (e.g., lithium metal), dissolving a portion of it and carrying the dissolved material into the device. In such embodiments, the reservoir may in some cases be renewed by running the device in electrical reverse, and depositing the electrochemical species back into the reservoir (e.g., into or onto some of its internal components). In either mode of operation, material may be loaded or unloaded onto the fluid passing through the reservoir by level-shifting the chemical potentials of the dissolved/suspended and precipitated/deposited states of the material, for example with temperature or pressure changes, with centrifugal or gravity-driven separation, or by filtration. In other embodiments, a carrier fluid may be charged with a dissolved gas (e.g., oxygen) that subsequently participates in the electrochemical reaction, or may be reacted with a suitable gas, typically but not necessarily before the fluid enters the reaction chamber or reaches the electrode surface.

According to one embodiment, depleted or partially-depleted fluid (either electrode or electrolyte fluid or both) may be removed from the device, for example into at least one holding tank or reservoir (not shown). (In this context, a fluid may be considered "depleted" if the concentration of a reaction product has been increased, as well as if the concentration of a reactant is decreased.) If its active component is not completely consumed, it may be desirable in some embodiments to recirculate this fluid through the device again, optionally after some degree of heating, cooling, or chemical reforming. The fluid may also be stored in a reservoir for later regeneration, either in device 10 as described above or in another device (which may be at another location). For example, device 10 may be used as a battery to provide power to a fixed (e.g., a building) or mobile (e.g., a vehicle) power consumer, and may be "recharged" by removing depleted or partially-depleted fluid from a reservoir and replacing it with fresh fluid. The depleted fluid may then, for example, be taken to a (possibly remote) recharging facility for recharging, thereby becoming available for reuse. In some embodiments, the power consumer may pay a price for the fresh fluid, which may depend in part on the concentration of electroactive species in the depleted or partially-depleted fluid, the fresh fluid, or both. (Other parameters which may factor into a unit price for replacement fluid may include the time of day, the day of the week, or prevailing prices for electricity or labor.) In some embodiments, the power consumer and the fluid provider may negotiate a mutually-acceptable price and properties for the replacement fluid (e.g., composition or concentration of electroactive species), and this negotiation (and optionally, payment) may be carried out in part or in whole by a predetermined (e.g., software) algorithm on the consumer side, the provider side, or both.

In some embodiments, the removal (e.g., drainage) of one or more fluids may also function as a temperature-regulation system for the electrochemical device, in which case it may be desirable to heat or cool the removed fluid (passively or actively) before recirculation into the device.

In some embodiments, sensors 26, 28 (or other appropriately placed sensors) may be used to monitor one or more electrochemical devices 10 for potential safety problems (e.g., conditions which may lead to mispositioning of one or more fluids relative to their design positions, excessive rates of chemical reaction or of fluid motion, overpressures, excessive temperatures, fires, or explosions), and to rapidly deactivate or neutralize one or more of these devices to maintain safety. For example, control circuitry may be provided so that, if overheating in one electrochemical cell in an array of such cells is detected, the offending cell is switched out of the array, and at least one of its electrochemically active fluids is rapidly removed (e.g., by gravity drainage, by action of a pump, in consequence of an applied stress such as a pressure difference, or by a Lorentz force) before it can (further) damage its own structure or that of its neighbors, contaminate a fluid, or otherwise degrade the overall system. Alternatively, the cell may be rapidly decommissioned by partially or fully isolating fluids from one another with a physical barrier, for example, by inserting a nonconductive sheet between the fluids, or by rotating a set of "Venetian blind" style barriers into position. (In some embodiments, such barriers may serve a dual purpose as baffles during operation of the device. Such baffles are described elsewhere herein, for example in connection with FIG. 2.) Conditions which may be monitored to trigger potential shutdown of certain devices or regions of a device include current, voltage, magnetic field, pressure, temperature, fluid level, fluid position, fluid configuration, fluid motion, acoustic, or light anomalies. One or more of these conditions may be monitored to initiate or guide or control the operation of damage-limiting or risk-reducing subsystems in the event of a detected malfunction.

In some embodiments, device 10 may include a temperature regulation system (not shown in FIG. 1), which may, for example, control temperature by moving a fluid or gas through a portion of the device, by changing the temperature of one or more of the electrochemically active fluids of the device (e.g., by circulation of part or all of the fluid through a heat exchanger), or by passively or actively moving a fluid or gas (e.g., air) around at least a portion of its external surface, for example by free, drafted, or forced convection. This external surface may be at least partly covered with material or structures having an insulating function, so as to assist in modulating the flow of heat into or out of the device. Heating or cooling of the device may also or alternatively be accomplished electrically, for example by resistive heating or using a thermoelectric effect (e.g., a Peltier-Seebeck effect). In some embodiments, controller 34 may operate or direct thermal controls, which may be responsive to device operating conditions, for example in response to sensors 26, 28 or other appropriately placed sensors. In some embodiments, different portions of the interior or exterior of device 10 may be maintained at different temperatures.

Figure 2:
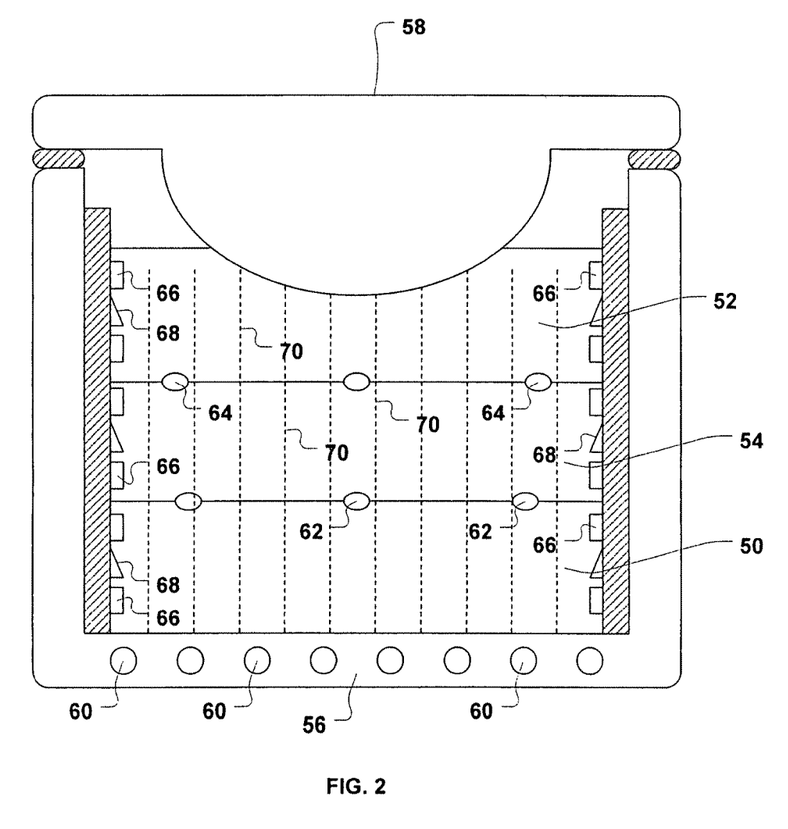
FIG. 2 is a schematic of an electrochemical device including three density-stratified fluid layers.

FIG. 2 is a schematic of an electrochemical device including two fluid electrodes, cathode 50 and anode 52, and a fluid electrolyte 54. A battery including three density-stratified fluid layers is shown, for example, in U.S. Published Patent Application No. 2008/0044725, "High-Amperage Energy Storage Device and Method," which is incorporated by reference herein. Conductive container 56 and lid 58 serve as electrical contacts for the device. Heating elements 60 function to maintain the battery at a suitable operating temperature.

In the illustrated embodiment, anti-sloshing baffles 70 are optional inert supports which function to prevent excessive movement of electroactive fluids 50, 52, 54. In some embodiments, electroactive fluids may tend to move during use, for example because the whole device is subjected to an acceleration or because of thermomechanical or electrodynamic forces within the device. In some cases, cell fluids or interfaces between these electroactive fluids may develop circulations, oscillations, or "waves." For example, as anode and cathode fluids approach one another, local current density increases between them, and Lorentz forces due to interaction of the increased current density and ambient magnetic field due to overall anode-cathode current flow will tend to reinforce the variation unstably, especially when the density difference between adjacent fluids is minimal. Baffles 70 may damp such oscillations (or oscillations from other sources) to minimize excessive variation. While illustrated baffles 70 are vertical, in other embodiments, baffles may be oriented horizontally or obliquely. Baffles may form a honeycomb or web, for example an open-cell foam, and may be perforated or otherwise arranged to permit some transverse flow while still retarding excessive fluid motions, for example those that may lead to sloshing. Alternatively, fluid motion may be damped by selectively biasing (either transiently or continually) one or more conducting grids (not shown in FIG. 2) to suppress local current density, or to actively damp electrodynamically excited fluid motions, as described elsewhere herein in connection with FIG. 4, or electroactive fluids 50 and 54 (or 52 and 54) may be separated by a membrane arranged to be permeable to ion transport but not to bulk fluid transport, which in some embodiments may be tensioned or otherwise arranged to provide some degree of mechanical support. In some embodiments, such a membrane may be used to permit the use of fluid arrangements in which a heavier fluid is positioned above a lighter fluid, or to allow vertical (or oblique) arrangements of fluids, instead of horizontal arrangements.

Sensors 62, 64 are positioned at the cathode/electrolyte interface and the anode/electrolyte interface respectively. In the illustrated embodiment, these interfaces are mobile, as the thickness of the electrolyte layer increases as the battery discharges and decreases as it charges. In other embodiments (not shown), these sensors may be placed at fixed locations relative to conductive container 56, for example by securing them with porous webbing or by affixing them to anti-sloshing baffles 70, or they may be mobile, for example being affixed to an actuated boom. In the illustrated embodiment, sensors 62, 64 are configured to remain with their respective interfaces, for example using surface energy effects or density gradients. (It will be understood that while a relatively small number of sensors are illustrated for purposes of clarity, in some embodiments, greater numbers of sensors may be used.) These sensors function to detect one or more interfacial operating parameters of interest, such as local concentration or chemical activity of a species of interest. Different sensors may detect the same or different operating parameters.

In the illustrated embodiment, sensors 66 are positioned at the inner wall of the device. These sensors also function to detect one or more operating parameters of interest. In some embodiments, sensors 66 may be used to detect the location of the cathode/electrolyte or the anode/electrolyte interface. Also positioned on the device wall in the illustrated embodiment are fluid-directing structures 68 (optional). In some embodiments (not illustrated), fluid-directing structures may also be positioned within the device. In some embodiments, fluid-directing structures may be responsive to operating conditions detected at any of sensors 62, 64, 66.

In some embodiments, it may be desirable to introduce or remove liquids from the device of FIG. 2 during operation. For example, in the battery described in U.S. Published Patent Application No. 2008/0044725, referenced above, during discharging, electrolyte layer 54 increases in thickness while cathode layer 50 and anode layer 52 shrink. If it is desired to maintain electrode-electrolyte interfaces at known positions, it may be desirable to introduce additional cathode and anode fluid and to remove electrolyte fluid during operation of the battery. Introduction and removal of fluid may be controlled by a controller using information about the interface positions obtained from any of sensors 62, 64, 66. In some embodiments, the composition or amount of removed fluid (e.g., electrolyte fluid) may be monitored outside the device in order to make inferences about the positions of the electrode-electrolyte interfaces.

Figure 3:
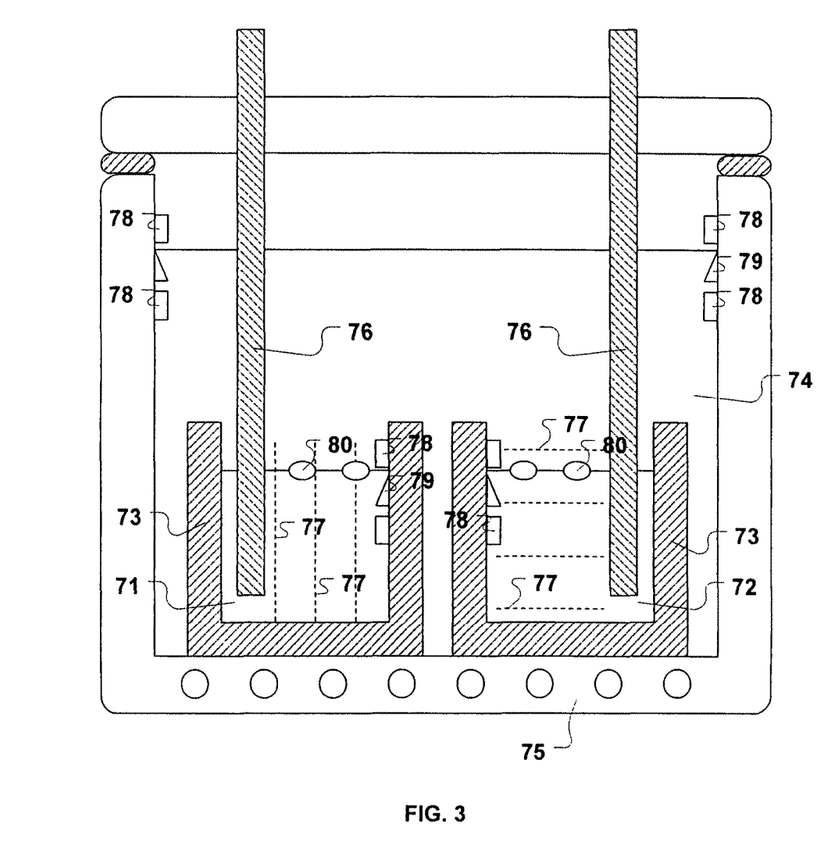
FIG. 3 is a schematic of an electrochemical device including side-by-side fluid electrodes.

FIG. 3 is a schematic illustrating an electrochemical device including side-by-side fluid electrodes. Cathode fluid 71 and anode fluid 72 are contained in impervious containers 73, which are submerged in electrolyte fluid 74 within container 75. Solid rods 76 serve as contacts for the electrochemically active fluid electrodes 71, 72. Anti-sloshing baffles 77 act to prevent excessive fluid motion within the device as described above in connection with FIG. 2. In other embodiments (not shown), fluid motion may be damped by selectively biasing (either transiently or continually) one or more conducting grids or portions thereof (not shown in FIG. 3) to suppress local current density, as described elsewhere herein in connection with FIG. 4.

In the illustrated embodiment, sensors 78 are positioned on containers 73, 75 near expected fluid interface locations, but sensors may be positioned wherever in or around the device it is desired to measure operating conditions, as described above in connection with FIG. 1 and FIG. 2. Optional fluid-directing structures 79 are also positioned on container 73, 75 walls in the illustrated embodiment, but may be placed anywhere in the device where fluid flow is to be controlled. In some embodiments, fluid-directing structures 79 may be responsive to sensors 78, 80. In the illustrated embodiment, sensors 80 are positioned at the interfaces between electrode fluids 71, 72 and electrolyte fluid 74, but in other embodiments (not shown), these sensors may be placed at fixed locations relative to containers 73, for example by securing them with porous webbing or by affixing them to anti-sloshing baffles 77, or they may be mobile, for example being affixed to an actuated boom.

Figure 4:
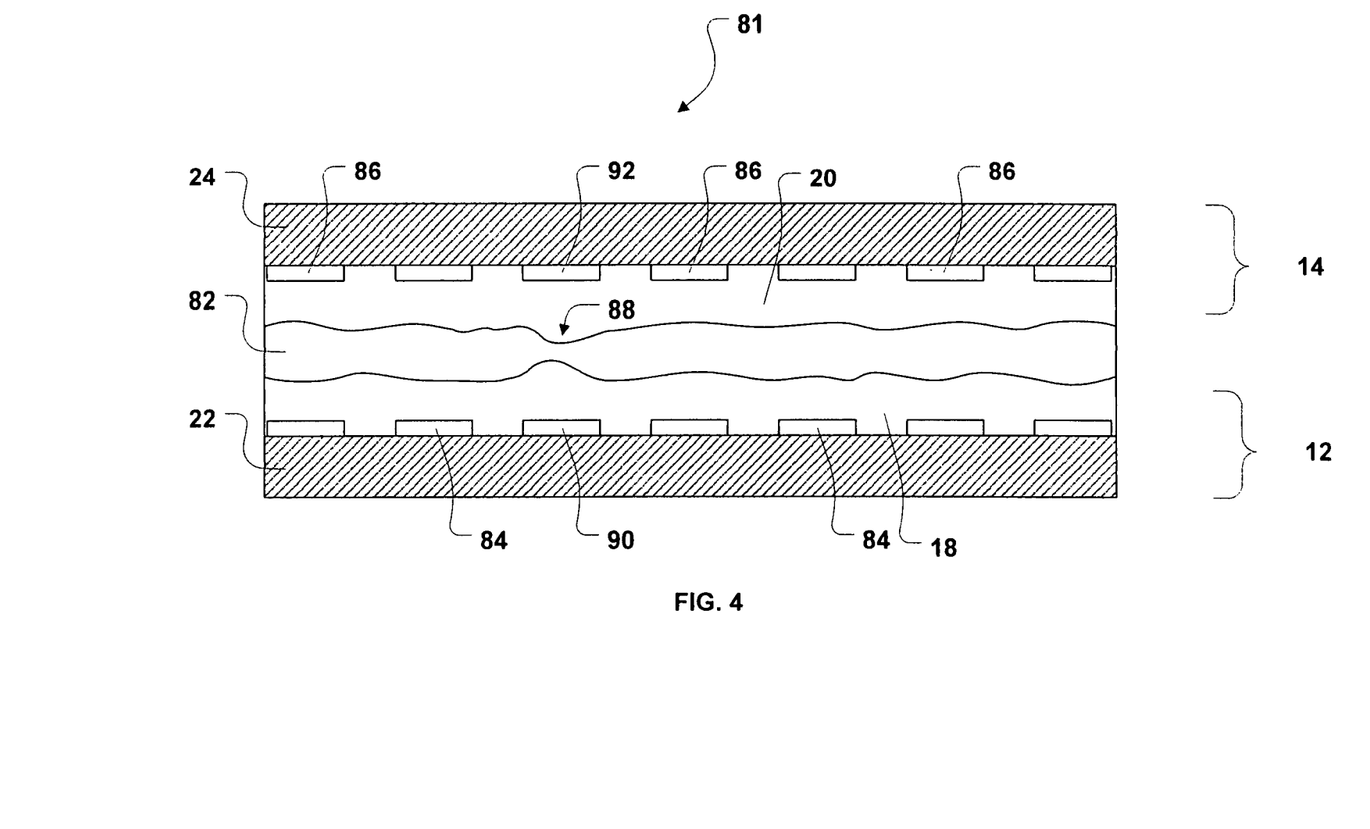
FIG. 4 is a schematic of an electrochemical device including two fluid-surfaced electrodes and a fluid electrolyte.

FIG. 4 is a schematic illustrating an instrumented electrochemical device 81 similar to the device of FIG. 1, but with a liquid electrolyte 82 and with fluid-damping capabilities. Liquid electrolyte 82, cathode fluid 18, and anode fluid 20 flow along cathode and anode solid supports 22, 24. In the illustrated embodiment, the interfaces between electrolyte 82 and cathode and anode fluids 18, 20 are not perfectly flat; variations in the interface have been exaggerated for clarity of description. Controllable conducting grids 84, 86 have been positioned along the surfaces of solid supports 22, 24 respectively. Current variations along the length of the device are monitored by sensors (not shown), which may be positioned on the solid supports 22, 24, at the interfaces between electrolyte 82 and electroactive fluids 18, 20, or elsewhere in a circuit, for example at the DC-DC converters illustrated in FIG. 5 and FIG. 6. If current in one region is measured to have increased in comparison to adjacent regions, cathode layer 18 and anode layer 20 may have approached one another due to fluid interface variations, as illustrated at point 88. In some cases, such variations may be metastable or unstable and may risk creating a contact between cathode fluid 18 and anode fluid 20, which may then commence to react or heat excessively rapidly, as well as to electrically short the cell. In order to avoid the risk of such a contact, conductive grids 90, 92 may be biased (e.g., transiently) in order to suppress local current density, thereby reducing the forces which could otherwise act to move the anode and cathode fluids together. Other means of preventing localized contact between anode and cathode contacts may include applying force to the anode and/or cathode fluids (e.g., using magnetic field coils), locally adding or removing fluid (e.g., though ports in the electrode supports), reducing local conductivity by introducing a nonconducting fluid or gas (e.g., gas bubbles) or by inserting a solid barrier between the electrodes (e.g., inserting a plate between the electrodes, closing pores in an existing porous barrier, or deploying the "Venetian blinds" described in connection with FIG. 1). In some embodiments, it may also be desirable to polarize selected sections of the grids to minimize the effects of spatial inhomogeneities in chemical composition of a fluid layer, for example by reducing local reaction rates in a region of the device where the local electrode or electrolyte fluid composition, temperature, or voltage indicates that they have been anomalously high. In some embodiments (not shown), grids of conductors can be located within the electrolyte, and can be selectively biased to modulate electric potentials or ion currents within the electrolyte.

Figure 5:
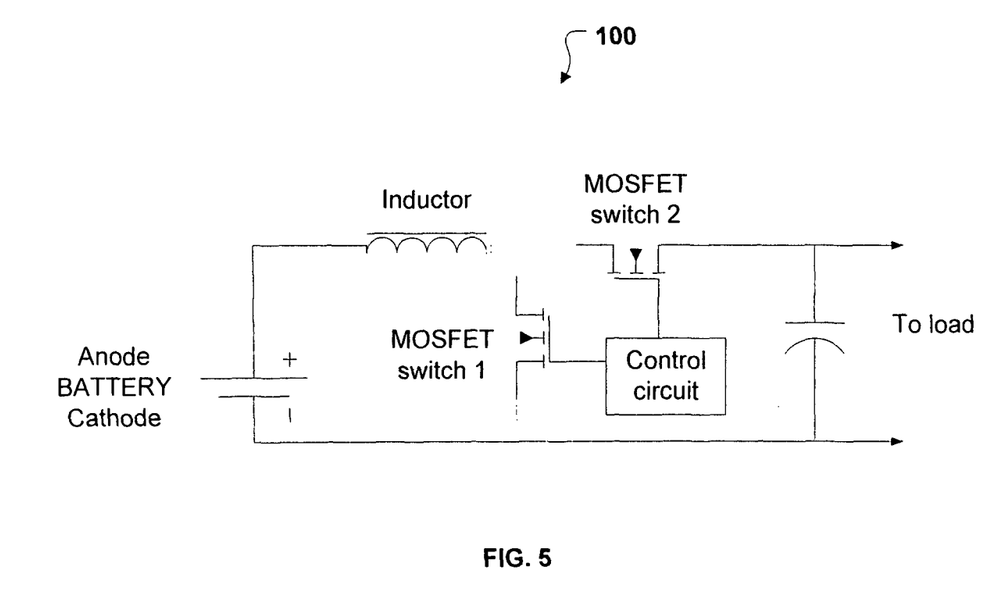
FIG. 5 is a diagram of a DC-DC converter that may be used with an electrochemical device.
Figure 6:
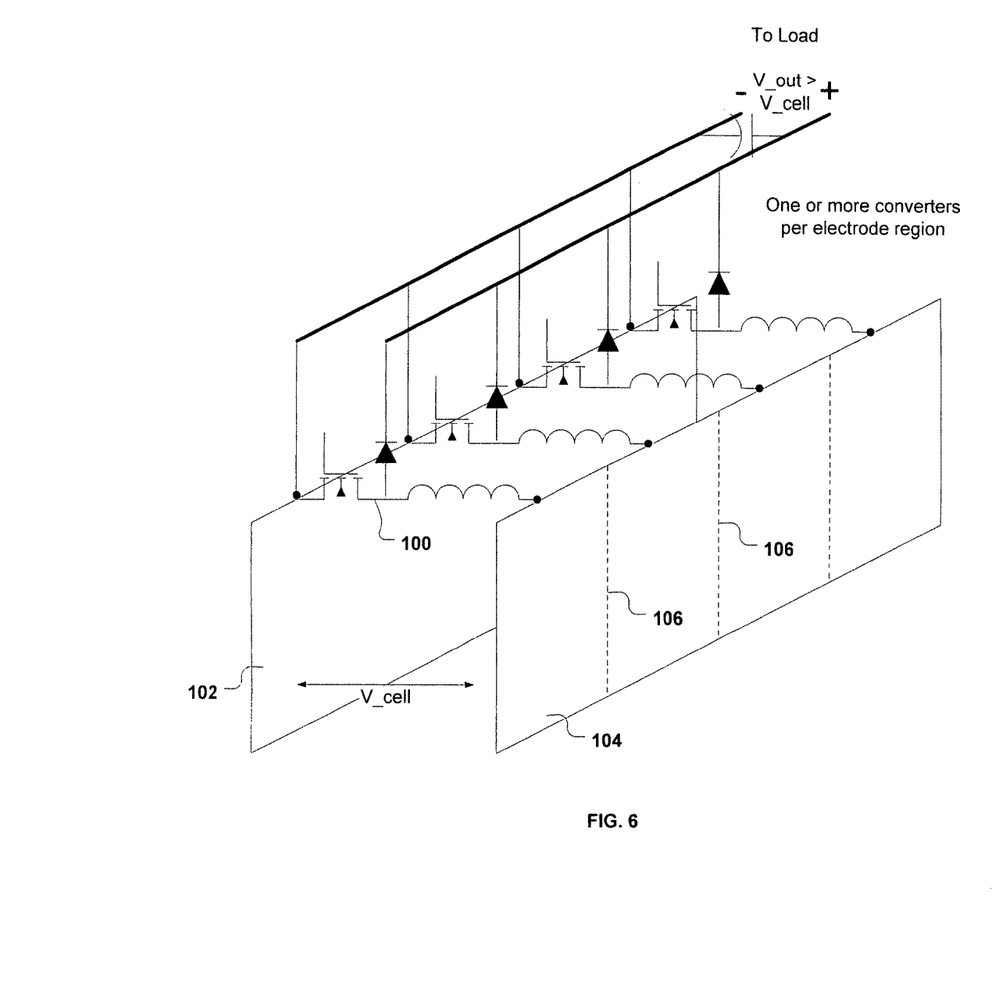
FIG. 6 is a schematic of an electrochemical device including multiple DC-DC converters.

FIG. 5 is an electrical diagram of a DC-DC converter 100 that may be used in conjunction with one or more electrochemical cells. FIG. 6 illustrates an electrochemical device including multiple DC-DC converters 100, which may be of the type shown in FIG. 5 or another suitable converter, such as a switch-capacitor voltage converter, an isolated (flyback-type or transformer coupled) converter (which may be connected in series or in parallel), or a multi-stage converter. A variety of potential converters are shown in "Switching Regulators," National Semiconductor, *Linear and Switching Voltage Regulator Fundamentals*, available at http://www.national.com/appinfo/power/files/f5.pdf, Horowitz & Hill, *The Art of Electronics*, Cambridge University Press, 1989, pp. 355-365, and Lenk, *Simplified Design of Switching Power Supplies* Newnes, 1995, (all, but especially at pp. 1-23), each of which is incorporated by reference herein. In the embodiment shown in FIG. 6, cathode 102 and anode 104 each include a solid support and electrochemically active fluid layer (not shown). Cathode 102 and anode 104 are separated by electrolyte (not shown), which may be, for example, fluid, solid, or mixed phase. In the illustrated embodiment, a plurality of corresponding regions (e.g., regions that oppose one another across the electrolyte) of cathode 102 and anode 104 are each connected to a DC-DC converter 100. DC-DC converters 100 are then connected to produce an output voltage. In some embodiments, this configuration allows the electrochemical cell to produce a higher (or lower) voltage for a given power output than that corresponding to its instantaneous electromotive force. DC-DC converters 100 may be connected to the solid supports within cathode 102 and anode 104, or to their fluid layers. In some embodiments, converter electronics 100 may be temperature-regulated, for example by the flow of electrochemically active fluids, by flowing other fluids or gases, or by air convection (e.g., forced, drafted, or free).

In the illustrated embodiment, anode 104 includes optional control regions 106 between connected regions. In some embodiments, these regions may be insulators, while in other embodiments, they may include active elements such as diodes. Control regions 106 may be provided on the anode, the cathode, both, or neither.

Many switching converters (such as that illustrated in FIG. 5) draw a time-varying current from the power source. In embodiments where it is desirable to maintain a relatively steady electrical load on the electrochemical cell (or on a subsection thereof), multiple voltage converters may be arranged in parallel to switch with different relative phases, so that at any given time, some are drawing increasing current and some are drawing decreasing current. This type of operation may be particularly convenient when interfacing with utility mains or grids (which are typically but not necessarily polyphase), but may be useful in other situations, as well. In embodiments where it is preferred to operate the electrochemical cell in a pulsed mode (e.g., due to diffusion effects or to suppress the formation, growth, or persistence of dendrites within the device), the converters may instead be arranged so that a particular section of the electrode delivers a pulsed current, but the entire assembly delivers roughly constant average current.

In some embodiments, the converters may be used to generate alternating-voltage outputs, for example by switching a pair of time-wise cyclical DC voltages which are out-of-phase relative to one another, connecting one or the other of them to the load in alternation (not shown). In this manner, the device may be a source of AC power. In a similar manner, AC power may be applied directly to the outer terminals of the device and converted into a suitable DC voltage (including voltage level-shifting as appropriate) for use in device charging (not shown). In some such embodiments, the AC power circuit providing power to the circuitry may be of a different phase than the AC power circuit being provided power by the battery system, so that the battery system may act as an electrochemical synchronous capacitor, simultaneously controllably phase-shifting AC power and sourcing or sinking some aspects of it (e.g., depending on input voltage phase and amplitude or desired voltage phase and amplitude). Such embodiments may be useful, among other things, for supporting operational stability of the electric utility grid or system of which the device is an electrical part.

In some embodiments, a battery system may be designed using these methods to charge at a somewhat lower grid voltage than that at which it discharges, so that aggregated bidirectional voltage drops at the interface with the grid are automatically compensated partially or fully. In such embodiments, the battery system can be made to appear to the electrical grid as an ideal store of electrical energy, independent of its physical and electrical location within the grid.

A wide variety of chemical reactions may be used in the electrochemical devices described herein. In principle, any pair of the half-reactions described in a standard half-cell electrochemical potential table may be used at the cathode and anode, although reactions that are substantially separated on an EMF-ordered table are preferred for some embodiments as they will yield a higher device voltage. (An example table of standard half-cell potentials is appended as Appendix A; however, any of the many electrochemical half-reactions not listed in Appendix A may also be used in the devices described herein.) In some embodiments, reactants that are liquid at device operating temperature (e.g., liquid metals and liquid metal alloys) may be preferred. Exemplary anode materials include lithium, sodium, mercury, tin, cesium, rubidium, potassium, calcium, strontium, aluminum, and compounds containing any of these, while exemplary cathode materials include gallium, iron, mercury, sulfur, tin, chlorine, oxygen, fluorine, and compounds containing any of these. Suitable electrolyte materials will generally include salts or other compounds compatible with the chosen anode and cathode materials, and optionally other materials not notably reactive with either of the electrode fluids. In some embodiments, the electrolyte may includes two or more distinct materials, separated from one another by a barrier (or by their own immiscibility) that precludes an unacceptable degree of mixing while permitting passage of at least one electrochemically active species. Any of the above materials may include dissolved gases (e.g., oxygen), which may in some embodiments participate in the overall electrochemical reaction.

Many of the embodiments described herein have referred to a single device or cell. In some embodiments, any of these devices may be provided in arrays, stacks, or other suitable arrangements, and may be electrically connected in series, in parallel, or in a combination of series and parallel connections.

Various embodiments of electrochemical devices and methods have been described herein. In general, features that have been described in connection with one particular embodiment may be used in other embodiments, unless context dictates otherwise. For example, the recharging facility described in connection with FIG. 1 may be employed in the devices described in connection with FIG. 2, or with any of the embodiments described herein. For the sake of brevity, descriptions of such features have not been repeated, but will be understood to be included in the different aspects and embodiments described herein.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an electrode" should typically be interpreted to mean "at least one electrode"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two fluid-directing structures," or "a plurality of fluid-directing structures," without other modifiers, typically means at least two fluid-directing structures). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Moreover, "can" and "optionally" and other permissive terms are used herein for describing optional features of various embodiments. These terms likewise describe selectable or configurable features generally, unless the context dictates otherwise.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably coupleable" to each other to achieve the desired functionality. Specific examples of operably coupleable include but are not limited to physically mateable or inter-acting components or wirelessly interacting components.

Those having skill in the art will recognize that the state of the art of circuit design has progressed to the point where there is typically little distinction left between hardware and software implementations of aspects of systems. The use of hardware or software is generally a design choice representing tradeoffs between cost, efficiency, flexibility, and other implementation considerations. Those having skill in the art will appreciate that there are various vehicles by which processes, systems, or other technologies involving the use of logic or circuits can be effected (e.g., hardware, software, or firmware), and that the preferred vehicle will vary with the context in which the processes, systems, or other technologies are deployed. For example, if an implementer determines that speed is paramount, the implementer may opt for a mainly hardware or firmware vehicle. Alternatively, if flexibility is paramount, the implementer may opt for a mainly software implementation. In these or other situations, the implementer may also opt for some combination of hardware, software, or firmware. Hence, there are several possible vehicles by which the processes, devices, or other technologies involving logic or circuits described herein may be effected, none of which is inherently superior to the other. Those skilled in the art will recognize that optical aspects of implementations may require optically-oriented hardware, software, and or firmware.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

APPENDIX A

| Half-reaction | E° (V) |
|---|---|
| $\frac{3}{2}N_2(g) + H^+ + e^- \rightleftharpoons HN_3(aq)$ | −3.09 |
| $Li^+ + e^- \rightleftharpoons Li(s)$ | −3.0401 |
| $N_2(g) + 4H_2O + 2e^- \rightleftharpoons 2NH_2OH(aq) + 2OH^-$ | −3.04 |
| $Cs^+ + e^- \rightleftharpoons Cs(s)$ | −3.026 |
| $Rb^+ + e^- \rightleftharpoons Rb(s)$ | −2.98 |
| $K^+ + e^- \rightleftharpoons K(s)$ | −2.931 |
| $Ba^{2+} + 2e^- \rightleftharpoons Ba(s)$ | −2.912 |
| $La(OH)_3(s) + 3e^- \rightleftharpoons La(s) + 3OH^-$ | −2.90 |

APPENDIX A-continued

| Half-reaction | E° (V) |
|---|---|
| $Sr^{2+} + 2e^- \rightleftharpoons Sr(s)$ | −2.899 |
| $Ca^{2+} + 2e^- \rightleftharpoons Ca(s)$ | −2.868 |
| $Eu^{2+} + 2e^- \rightleftharpoons Eu(s)$ | −2.812 |
| $Ra^{2+} + 2e^- \rightleftharpoons Ra(s)$ | −2.8 |
| $Na^+ + e^- \rightleftharpoons Na(s)$ | −2.71 |
| $La^{3+} + 3e^- \rightleftharpoons La(s)$ | −2.379 |
| $Y^{3+} + 3e^- \rightleftharpoons Y(s)$ | −2.372 |
| $Mg^{2+} + 2e^- \rightleftharpoons Mg(s)$ | −2.372 |
| $ZrO(OH)_2(s) + H_2O + 4e^- \rightleftharpoons Zr(s) + 4OH^-$ | −2.36 |
| $Al(OH)_4^- + 3e^- \rightleftharpoons Al(s) + 4OH^-$ | −2.33 |
| $Al(OH)_3(s) + 3e^- \rightleftharpoons Al(s) + 3OH^-$ | −2.31 |
| $H_2(g) + 2e^- \rightleftharpoons 2H^-$ | −2.25 |
| $Ac^{3+} + 3e^- \rightleftharpoons Ac(s)$ | −2.20 |
| $Be^{2+} + 2e^- \rightleftharpoons Be(s)$ | −1.85 |
| $U^{3+} + 3e^- \rightleftharpoons U(s)$ | −1.66 |
| $Al^{3+} + 3e^- \rightleftharpoons Al(s)$ | −1.66 |
| $Ti^{2+} + 2e^- \rightleftharpoons Ti(s)$ | −1.63 |
| $ZrO_2(s) + 4H^+ + 4e^- \rightleftharpoons Zr(s) + 2H_2O$ | −1.553 |
| $Zr^{4+} + 4e^- \rightleftharpoons Zr(s)$ | −1.45 |
| $TiO(s) + 2H^+ + 2e^- \rightleftharpoons Ti(s) + H_2O$ | −1.31 |
| $Ti_2O_3(s) + 2H^+ + 2e^- \rightleftharpoons 2TiO(s) + H_2O$ | −1.23 |
| $Ti^{3+} + 3e^- \rightleftharpoons Ti(s)$ | −1.21 |
| $Mn^{2+} + 2e^- \rightleftharpoons Mn(s)$ | −1.185 |
| $Te(s) + 2e^- \rightleftharpoons Te^{2-}$ | −1.143 |
| $V^{2+} + 2e^- \rightleftharpoons V(s)$ | −1.13 |
| $Nb^{3+} + 3e^- \rightleftharpoons Nb(s)$ | −1.099 |
| $Sn(s) + 4H^+ + 4e^- \rightleftharpoons SnH_4(g)$ | −1.07 |
| $SiO_2(s) + 4H^+ + 4e^- \rightleftharpoons Si(s) + 2H_2O$ | −0.91 |
| $B(OH)_3(aq) + 3H^+ + 3e^- \rightleftharpoons B(s) + 3H_2O$ | −0.89 |
| $TiO^{2+} + 2H^+ + 4e^- \rightleftharpoons Ti(s) + H_2O$ | −0.86 |
| $Bi(s) + 3H^+ + 3e^- \rightleftharpoons BiH_3$ | −0.8 |
| $H_2O + 2e^- \rightleftharpoons H_2(g) + 2OH^-$ | −0.8277 |
| $Zn^{2+} + 2e^- \rightleftharpoons Zn(Hg)$ | −0.7628 |
| $Zn^{2+} + 2e^- \rightleftharpoons Zn(s)$ | −0.7618 |
| $Ta_2O_5(s) + 10H^+ + 10e^- \rightleftharpoons 2Ta(s) + 5H_2O$ | −0.75 |
| $Cr^{3+} + 3e^- \rightleftharpoons Cr(s)$ | −0.74 |
| $[Au(CN)_2]^- + e^- \rightleftharpoons Au(s) + 2CN^-$ | −0.60 |
| $Ta^{3+} + 3e^- \rightleftharpoons Ta(s)$ | −0.6 |
| $PbO(s) + H_2O + 2e^- \rightleftharpoons Pb(s) + 2OH^-$ | −0.58 |
| $2TiO_2(s) + 2H^+ + 2e^- \rightleftharpoons Ti_2O_3(s) + H_2O$ | −0.56 |
| $Ga^{3+} + 3e^- \rightleftharpoons Ga(s)$ | −0.53 |
| $AgI(s) + e^- \rightleftharpoons Ag(s) + I^-$ | −0.15224 |
| $U^{4+} + e^- \rightleftharpoons U^{3+}$ | −0.52 |
| $H_3PO_2(aq) + H^+ + e^- \rightleftharpoons P(white) + 2H_2O$ | −0.508 |
| $H_3PO_3(aq) + 2H^+ + 2e^- \rightleftharpoons H_3PO_2(aq) + H_2O$ | −0.499 |
| $H_3PO_3(aq) + 3H^+ + 3e^- \rightleftharpoons P(red) + 3H_2O$ | −0.454 |
| $Fe^{2+} + 2e^- \rightleftharpoons Fe(s)$ | −0.44 |
| $2CO_2(g) + 2H^+ + 2e^- \rightleftharpoons HOOCCOOH(aq)$ | −0.43 |
| $Cr^{3+} + e^- \rightleftharpoons Cr^{2+}$ | −0.42 |
| $Cd^{2+} + 2e^- \rightleftharpoons Cd(s)$ | −0.40 |
| $GeO_2(s) + 2H^+ + 2e^- \rightleftharpoons GeO(s) + H_2O$ | −0.37 |
| $Cu_2O(s) + H_2O + 2e^- \rightleftharpoons 2Cu(s) + 2OH^-$ | −0.360 |
| $PbSO_4(s) + 2e^- \rightleftharpoons Pb(s) + SO_4^{2-}$ | −0.3588 |
| $PbSO_4(s) + 2e^- \rightleftharpoons Pb(Hg) + SO_4^{2-}$ | −0.3505 |
| $Eu^{3+} + e^- \rightleftharpoons Eu^{2+}$ | −0.35 |
| $In^{3+} + 3e^- \rightleftharpoons In(s)$ | −0.34 |
| $Tl^+ + e^- \rightleftharpoons Tl(s)$ | −0.34 |
| $Ge(s) + 4H^+ + 4e^- \rightleftharpoons GeH_4(g)$ | −0.29 |
| $Co^{2+} + 2e^- \rightleftharpoons Co(s)$ | −0.28 |
| $H_3PO_4(aq) + 2H^+ + 2e^- \rightleftharpoons H_3PO_3(aq) + H_2O$ | −0.276 |
| $V^{3+} + e^- \rightleftharpoons V^{2+}$ | −0.26 |
| $Ni^{2+} + 2e^- \rightleftharpoons Ni(s)$ | −0.25 |
| $As(s) + 3H^+ + 3e^- \rightleftharpoons AsH_3(g)$ | −0.23 |
| $MoO_2(s) + 4H^+ + 4e^- \rightleftharpoons Mo(s) + 2H_2O$ | −0.15 |
| $Si(s) + 4H^+ + 4e^- \rightleftharpoons SiH_4(g)$ | −0.14 |
| $Sn^{2+} + 2e^- \rightleftharpoons Sn(s)$ | −0.13 |
| $O_2(g) + H^+ + e^- \rightleftharpoons HO_2\bullet(aq)$ | −0.13 |
| $Pb^{2+} + 2e^- \rightleftharpoons Pb(s)$ | −0.13 |
| $WO_2(s) + 4H^+ + 4e^- \rightleftharpoons W(s) + 2H_2O$ | −0.12 |
| $P(red) + 3H^+ + 3e^- \rightleftharpoons PH_3(g)$ | −0.111 |
| $CO_2(g) + 2H^+ + 2e^- \rightleftharpoons HCOOH(aq)$ | −0.11 |
| $Se(s) + 2H^+ + 2e^- \rightleftharpoons H_2Se(g)$ | −0.11 |
| $CO_2(g) + 2H^+ + 2e^- \rightleftharpoons CO(g) + H_2O$ | −0.11 |
| $SnO(s) + 2H^+ + 2e^- \rightleftharpoons Sn(s) + H_2O$ | −0.10 |
| $SnO_2(s) + 2H^+ + 2e^- \rightleftharpoons SnO(s) + H_2O$ | −0.09 |
| $WO_3(aq) + 6H^+ + 6e^- \rightleftharpoons W(s) + 3H_2O$ | −0.09 |
| $P(white) + 3H^+ + 3e^- \rightleftharpoons PH_3(g)$ | −0.063 |
| $HCOOH(aq) + 2H^+ + 2e^- \rightleftharpoons HCHO(aq) + H_2O$ | −0.03 |
| $2H^+ + 2e^- \rightleftharpoons H_2(g)$ | 0.0000 |
| $AgBr(s) + e^- \rightleftharpoons Ag(s) + Br^-$ | +0.07133 |
| $S_4O_6^{2-} + 2e^- \rightleftharpoons 2S_2O_3^{2-}$ | +0.08 |
| $Fe_3O_4(s) + 8H^+ + 8e^- \rightleftharpoons 3Fe(s) + 4H_2O$ | +0.085 |
| $N_2(g) + 2H_2O + 6H^+ + 6e^- \rightleftharpoons 2NH_4OH(aq)$ | +0.092 |
| $HgO(s) + H_2O + 2e^- \rightleftharpoons Hg(l) + 2OH^-$ | +0.0977 |
| $Cu(NH_3)_4^{2+} + e^- \rightleftharpoons Cu(NH_3)_2^+ + 2NH_3$ | +0.10 |
| $Ru(NH_3)_6^{3+} + e^- \rightleftharpoons Ru(NH_3)_6^{2+}$ | +0.10 |
| $N_2H_4(aq) + 4H_2O + 2e^- \rightleftharpoons 2NH_4^+ + 4OH^-$ | +0.11 |
| $H_2MoO_4(aq) + 6H^+ + 6e^- \rightleftharpoons Mo(s) + 4H_2O$ | +0.11 |
| $Ge^{4+} + 4e^- \rightleftharpoons Ge(s)$ | +0.12 |
| $C(s) + 4H^+ + 4e^- \rightleftharpoons CH_4(g)$ | +0.13 |
| $HCHO(aq) + 2H^+ + 2e^- \rightleftharpoons CH_3OH(aq)$ | +0.13 |
| $S(s) + 2H^+ + 2e^- \rightleftharpoons H_2S(g)$ | +0.14 |
| $Sn^{4+} + 2e^- \rightleftharpoons Sn^{2+}$ | +0.15 |
| $Cu^{2+} + e^- \rightleftharpoons Cu^+$ | +0.159 |
| $HSO_4^- + 3H^+ + 2e^- \rightleftharpoons SO_2(aq) + 2H_2O$ | +0.16 |
| $UO_2^{2+} + e^- \rightleftharpoons UO_2^+$ | +0.163 |
| $SO_4^{2-} + 4H^+ + 2e^- \rightleftharpoons SO_2(aq) + 2H_2O$ | +0.17 |
| $TiO^{2+} + 2H^+ + e^- \rightleftharpoons Ti^{3+} + H_2O$ | +0.19 |
| $Bi^{3+} + 2e^- \rightleftharpoons Bi^+$ | +0.2 |
| $SbO^+ + 2H^+ + 3e^- \rightleftharpoons Sb(s) + H_2O$ | +0.20 |
| $AgCl(s) + e^- \rightleftharpoons Ag(s) + Cl^-$ | +0.22233 |
| $H_3AsO_3(aq) + 3H^+ + 3e^- \rightleftharpoons As(s) + 3H_2O$ | +0.24 |
| $GeO(s) + 2H^+ + 2e^- \rightleftharpoons Ge(s) + H_2O$ | +0.26 |
| $UO_2^+ + 4H^+ + e^- \rightleftharpoons U^{4+} + 2H_2O$ | +0.273 |
| $Re^{3+} + 3e^- \rightleftharpoons Re(s)$ | +0.300 |
| $Bi^{3+} + 3e^- \rightleftharpoons Bi(s)$ | +0.32 |
| $VO^{2+} + 2H^+ + e^- \rightleftharpoons V^{3+} + H_2O$ | +0.34 |
| $Cu^{2+} + 2e^- \rightleftharpoons Cu(s)$ | +0.340 |
| $[Fe(CN)_6]^{3-} + e^- \rightleftharpoons [Fe(CN)_6]^{4-}$ | +0.36 |
| $O_2(g) + 2H_2O + 4e^- \rightleftharpoons 4OH^-(aq)$ | +0.40 |
| $H_2MoO_4 + 6H^+ + 3e^- \rightleftharpoons Mo^{3+} + 2H_2O$ | +0.43 |
| $Bi^+ + e^- \rightleftharpoons Bi(s)$ | +0.50 |
| $CH_3OH(aq) + 2H^+ + 2e^- \rightleftharpoons CH_4(g) + H_2O$ | +0.50 |
| $SO_2(aq) + 4H^+ + 4e^- \rightleftharpoons S(s) + 2H_2O$ | +0.50 |
| $Cu^+ + e^- \rightleftharpoons Cu(s)$ | +0.520 |
| $CO(g) + 2H^+ + 2e^- \rightleftharpoons C(s) + H_2O$ | +0.52 |
| $I_2(s) + 2e^- \rightleftharpoons 2I^-$ | +0.54 |
| $I_3^- + 2e^- \rightleftharpoons 3I^-$ | +0.53 |
| $[AuI_4]^- + 3e^- \rightleftharpoons Au(s) + 4I^-$ | +0.56 |
| $H_3AsO_4(aq) + 2H^+ + 2e^- \rightleftharpoons H_3AsO_3(aq) + H_2O$ | +0.56 |
| $[AuI_2]^- + e^- \rightleftharpoons Au(s) + 2I^-$ | +0.58 |
| $MnO_4^- + 2H_2O + 3e^- \rightleftharpoons MnO_2(s) + 4OH^-$ | +0.59 |
| $S_2O_3^{2-} + 6H^+ + 4e^- \rightleftharpoons 2S(s) + 3H_2O$ | +0.60 |
| $H_2MoO_4(aq) + 2H^+ + 2e^- \rightleftharpoons MoO_2(s) + 2H_2O$ | +0.65 |
| $O_2(g) + 2H^+ + 2e^- \rightleftharpoons H_2O_2(aq)$ | +0.70 |
| $Tl^{3+} + 3e^- \rightleftharpoons Tl(s)$ | +0.72 |
| $PtCl_6^{2-} + 2e^- \rightleftharpoons PtCl_4^{2-} + 2Cl^-$ | +0.726 |
| $H_2SeO_3(aq) + 4H^+ + 4e^- \rightleftharpoons Se(s) + 3H_2O$ | +0.74 |
| $PtCl_4^{2-} + 2e^- \rightleftharpoons Pt(s) + 4Cl^-$ | +0.758 |
| $Fe^{3+} + e^- \rightleftharpoons Fe^{2+}$ | +0.77 |
| $Ag^+ + e^- \rightleftharpoons Ag(s)$ | +0.7996 |
| $Hg_2^{2+} + 2e^- \rightleftharpoons 2Hg(l)$ | +0.80 |
| $NO_3^-(aq) + 2H^+ + e^- \rightleftharpoons NO_2(g) + H_2O$ | +0.80 |
| $[AuBr_4]^- + 3e^- \rightleftharpoons Au(s) + 4Br^-$ | +0.85 |
| $Hg^{2+} + 2e^- \rightleftharpoons Hg(l)$ | +0.85 |
| $MnO_4^- + H^+ + e^- \rightleftharpoons HMnO_4^-$ | +0.90 |
| $2Hg^{2+} + 2e^- \rightleftharpoons Hg_2^{2+}$ | +0.91 |
| $Pd^{2+} + 2e^- \rightleftharpoons Pd(s)$ | +0.915 |
| $[AuCl_4]^- + 3e^- \rightleftharpoons Au(s) + 4Cl^-$ | +0.93 |
| $MnO_2(s) + 4H^+ + e^- \rightleftharpoons Mn^{3+} + 2H_2O$ | +0.95 |
| $[AuBr_2]^- + e^- \rightleftharpoons Au(s) + 2Br^-$ | +0.96 |
| $Br_2(l) + 2e^- \rightleftharpoons 2Br^-$ | +1.066 |
| $Br_2(aq) + 2e^- \rightleftharpoons 2Br^-$ | +1.0873 |
| $IO_3^- + 5H^+ + 4e^- \rightleftharpoons HIO(aq) + 2H_2O$ | +1.13 |
| $[AuCl_2]^- + e^- \rightleftharpoons Au(s) + 2Cl^-$ | +1.15 |
| $HSeO_4^- + 3H^+ + 2e^- \rightleftharpoons H_2SeO_3(aq) + H_2O$ | +1.15 |
| $Ag_2O(s) + 2H^+ + 2e^- \rightleftharpoons 2Ag(s) + H_2O$ | +1.17 |
| $ClO_3^- + 2H^+ + e^- \rightleftharpoons ClO_2(g) + H_2O$ | +1.18 |
| $Pt^{2+} + 2e^- \rightleftharpoons Pt(s)$ | +1.188 |
| $ClO_2(g) + H^+ + e^- \rightleftharpoons HClO_2(aq)$ | +1.19 |
| $2IO_3^- + 12H^+ + 10e^- \rightleftharpoons I_2(s) + 6H_2O$ | +1.20 |
| $ClO_4^- + 2H^+ + 2e^- \rightleftharpoons ClO_3^- + H_2O$ | +1.20 |
| $O_2(g) + 4H^+ + 4e^- \rightleftharpoons 2H_2O$ | +1.23 |
| $MnO_2(s) + 4H^+ + 2e^- \rightleftharpoons Mn^{2+} + 2H_2O$ | +1.23 |
| $Tl^{3+} + 2e^- \rightleftharpoons Tl^+$ | +1.25 |
| $Cl_2(g) + 2e^- \rightleftharpoons 2Cl^-$ | +1.36 |

APPENDIX A-continued

| Half-reaction | E° (V) |
|---|---|
| $Cr_2O_7^{--} + 14H^+ + 6e^- \rightleftharpoons 2Cr^{3+} + 7H_2O$ | +1.33 |
| $CoO_2(s) + 4H^+ + e^- \rightleftharpoons Co^{3+} + 2H_2O$ | +1.42 |
| $2NH_3OH^+ + H^+ + 2e^- \rightleftharpoons N_2H_5^+ + 2H_2O$ | +1.42 |
| $2HIO(aq) + 2H^+ + 2e^- \rightleftharpoons I_2(s) + 2H_2O$ | +1.44 |
| $Ce^{4+} + e^- \rightleftharpoons Ce^{3+}$ | +1.44 |
| $BrO_3^- + 5H^+ + 4e^- \rightleftharpoons HBrO(aq) + 2H_2O$ | +1.45 |
| $\beta\text{-}PbO_2(s) + 4H^+ + 2e^- \rightleftharpoons Pb^{2+} + 2H_2O$ | +1.460 |
| $\alpha\text{-}PbO_2(s) + 4H^+ + 2e^- \rightleftharpoons Pb^{2+} + 2H_2O$ | +1.468 |
| $2BrO_3^- + 12H^+ + 10e^- \rightleftharpoons Br_2(l) + 6H_2O$ | +1.48 |
| $2ClO_3^- + 12H^+ + 10e^- \rightleftharpoons Cl_2(g) + 6H_2O$ | +1.49 |
| $MnO_4^- + 8H^+ + 5e^- \rightleftharpoons Mn^{2+} + 4H_2O$ | +1.51 |
| $HO_2^{\bullet} + H^+ + e^- \rightleftharpoons H_2O_2(aq)$ | +1.51 |
| $Au^{3+} + 3e^- \rightleftharpoons Au(s)$ | +1.52 |
| $NiO_2(s) + 4H^+ + 2e^- \rightleftharpoons Ni^{2+} + 2OH^-$ | +1.59 |
| $2HClO(aq) + 2H^+ + 2e^- \rightleftharpoons Cl_2(g) + 2H_2O$ | +1.63 |
| $Ag_2O_3(s) + 6H^+ + 4e^- \rightleftharpoons 2Ag^+ + 3H_2O$ | +1.67 |
| $HClO_2(aq) + 2H^+ + 2e^- \rightleftharpoons HClO(aq) + H_2O$ | +1.67 |
| $Pb^{4+} + 2e^- \rightleftharpoons Pb^{2+}$ | +1.69 |
| $MnO_4^- + 4H^+ + 3e^- \rightleftharpoons MnO_2(s) + 2H_2O$ | +1.70 |
| $H_2O_2(aq) + 2H^+ + 2e^- \rightleftharpoons 2H_2O$ | +1.78 |
| $AgO(s) + 2H^+ + e^- \rightleftharpoons Ag^+ + H_2O$ | +1.77 |
| $Co^{3+} + e^- \rightleftharpoons Co^{2+}$ | +1.82 |
| $Au^+ + e^- \rightleftharpoons Au(s)$ | +1.83 |
| $BrO_4^- + 2H^+ + 2e^- \rightleftharpoons BrO_3^- + H_2O$ | +1.85 |
| $Ag^{2+} + e^- \rightleftharpoons Ag^+$ | +1.98 |
| $S_2O_8^{2-} + 2e^- \rightleftharpoons 2SO_4^{2-}$ | +2.010 |
| $O_3(g) + 2H^+ + 2e^- \rightleftharpoons O_2(g) + H_2O$ | +2.075 |
| $HMnO_4^- + 3H^+ + 2e^- \rightleftharpoons MnO_2(s) + 2H_2O$ | +2.09 |
| $F_2(g) + 2e^- \rightleftharpoons 2F^-$ | +2.87 |
| $F_2(g) + 2H^+ + 2e^- \rightleftharpoons 2HF(aq)$ | +3.05 |

What is claimed is:

1. An electrochemical device, comprising:
   two electrodes, wherein at least one of the electrodes includes an electrochemically active fluid layer;
   an electrolyte not a part of the two electrodes configured to conduct an ionic current from a first electrolyte surface in contact with one of the electrodes to a second electrolyte surface in contact with another of the electrodes, wherein the electrolyte is in contact with a surface of the electrochemically active fluid layer;
   fluid directing structures configured to control at least one of a flow rate or a flow direction of the electrochemically active fluid layer by altering a fluid property of the electrochemically active fluid layer; and
   a plurality of local sensors configured to detect an operating condition of the electrochemical device, each local sensor being configured to detect the operating condition at a predetermined location within the device;
   wherein at least one local sensor of the plurality of local sensors is located at a single interface between one of the electrodes and the electrolyte and in direct contact with one of the electrodes and the electrolyte; and
   wherein the at least one local sensor of the plurality of local sensors is configured to detect the operating condition of the electrochemical device at the single interface between one of the electrodes and the electrolyte.

2. The electrochemical device of claim 1, further comprising a controller configured to use data from the plurality of local sensors to direct an adjustment of an operating parameter of the electrochemical device.

3. The electrochemical device of claim 2, wherein the controller is configured to use data from at least two local sensors of the plurality of local sensors to direct an adjustment of the operating parameter of the electrochemical device.

4. The electrochemical device of claim 1, further comprising a controller configured to respond to a signal from the plurality of local sensors by modifying an operating parameter of the electrochemical device.

5. The electrochemical device of claim 4, wherein the controller includes a memory.

6. The electrochemical device of claim 4, wherein the controller includes a transmitter.

7. The electrochemical device of claim 4, wherein the controller is configured to respond to a history of signals from the plurality of local sensors by modifying the operating parameter of the electrochemical device.

8. The electrochemical device of claim 1, wherein the plurality of local sensors includes at least two sensors configured to detect different operating conditions.

9. The electrochemical device of claim 1, wherein the plurality of local sensors includes at least two sensors configured to detect the same operating condition.

10. The electrochemical device of claim 9, wherein the at least two sensors configured to detect the same operating condition are configured to detect the same operating condition at two different locations, respectively.

11. The electrochemical device of claim 1, wherein at least one local sensor is configured to detect an operating condition at an interface between the electrochemically active fluid layer and a solid support configured to support the electrochemically active fluid layer.

12. The electrochemical device of claim 1, wherein the operating condition is a condition of the electrochemically active fluid layer selected from the group consisting of chemical composition, chemical activity, ion density, density, temperature, flow velocity, flow direction, viscosity, and surface tension.

13. The electrochemical device of claim 1, wherein the operating condition is selected from the group consisting of temperature, magnetic field magnitude, magnetic field direction, electrochemical potential, current, current density, and distance between two surfaces of the device.

14. The electrochemical device of claim 1, wherein the operating condition is a position of a portion of a surface of the electrochemically active fluid layer.

15. The electrochemical device of claim 1, wherein the operating condition is a gradient of a condition of the electrochemically active fluid layer selected from the group consisting of chemical composition, ion density, density, temperature, flow velocity, flow direction, viscosity, and surface tension.

16. The electrochemical device of claim 1, wherein the operating condition is a gradient of a condition selected from the group consisting of temperature, magnetic field magnitude, magnetic field direction, electrochemical potential, current, and distance between two surfaces of the device.

17. The electrochemical device of claim 1, wherein the at least one of the electrodes includes a solid support, wherein the electrochemically active fluid layer is configured to cling to the solid support by a surface energy effect.

18. The electrochemical device of claim 17, wherein the solid support includes a fluid-directing structure.

19. The electrochemical device of claim 18, wherein the fluid-directing structure is configured to adjust a flow parameter of the electrochemically active fluid layer in response to an operating condition detected by at least one local sensor of the plurality of local sensors.

20. The electrochemical device of claim 1, wherein the electrolyte is further arranged to conduct an ionic current from the second electrolyte surface to the first electrolyte surface.

21. The electrochemical device of claim 1, wherein the electrolyte includes a solid surface impervious to the electrochemically active fluid.

22. The electrochemical device of claim 1, wherein the electrolyte includes an ion-transport fluid through which an ion can move to produce the ionic current.

23. The electrochemical device of claim 22, wherein the electrolyte further includes a solid structure.

24. The electrochemical device of claim 1, wherein the electrochemically active fluid layer includes a liquid metal, an ionic fluid, a finely dispersed metal, a finely dispersed semi-metal, a finely dispersed semiconductor, or a finely dispersed dielectric.

25. The electrochemical device of claim 1, wherein the plurality of local sensors includes magnetic field sensors.

* * * * *